(12) United States Patent
Zangl et al.

(10) Patent No.: US 7,880,481 B2
(45) Date of Patent: Feb. 1, 2011

(54) CAPACITIVE SENSOR AND MEASUREMENT SYSTEM

(75) Inventors: Hubert Zangl, Graz (AT); Thomas Bretterklieber, Leiboch (AT); Gert Holler, Graz (AT); Georg Brasseur, Vienna (AT); Tobias Werth, Villach (AT); Dirk Hammerschmidt, Villach (AT); Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 526 days.

(21) Appl. No.: 11/959,978

(22) Filed: Dec. 19, 2007

(65) Prior Publication Data
US 2009/0160461 A1 Jun. 25, 2009

(51) Int. Cl.
*G01R 27/26* (2006.01)
(52) U.S. Cl. .................................. 324/684; 324/686
(58) Field of Classification Search .............. 324/684, 324/658, 649, 600, 662, 678, 679, 686
See application file for complete search history.

(56) References Cited

U.S. PATENT DOCUMENTS

| | | | |
|---|---|---|---|
| 4,114,090 A * | 9/1978 | Poskitt | ............... 324/667 |
| 4,977,786 A | 12/1990 | Davis | |
| 5,172,065 A | 12/1992 | Wallrafen | |
| 5,446,391 A | 8/1995 | Aoki et al. | |
| 6,283,504 B1 | 9/2001 | Stanley et al. | |
| 6,411,107 B1 * | 6/2002 | Ishikura | ............... 324/658 |
| 6,499,359 B1 | 12/2002 | Washeleski et al. | |
| 6,517,106 B1 | 2/2003 | Stanley et al. | |
| 6,520,535 B1 | 2/2003 | Stanley et al. | |
| 6,563,231 B1 | 5/2003 | Stanley et al. | |
| 6,577,023 B1 | 6/2003 | Stanley et al. | |
| 6,609,055 B2 | 8/2003 | Stanley | |
| 6,768,319 B2 * | 7/2004 | Wang | ............... 324/679 |
| 7,098,673 B2 | 8/2006 | Launay et al. | |
| 7,129,714 B2 | 10/2006 | Baxter | |
| 7,571,065 B2 * | 8/2009 | Seesink | ............... 702/85 |
| 2004/0124857 A1 | 7/2004 | Jordana et al. | |
| 2005/0068043 A1 | 3/2005 | Launay et al. | |
| 2005/0253712 A1 | 11/2005 | Kimura et al. | |
| 2009/0001998 A1 * | 1/2009 | Tateishi et al. | ............... 324/686 |

FOREIGN PATENT DOCUMENTS

| | | |
|---|---|---|
| DE | 4313390 A1 | 10/1993 |
| DE | 19813013 | 4/2000 |
| DE | 102005047137 A1 | 4/2007 |

* cited by examiner

*Primary Examiner*—Hoai-An D Nguyen
(74) *Attorney, Agent, or Firm*—Dicke, Billig & Czaja, PLLC

(57) ABSTRACT

A system includes a capacitive sensor including a first electrode and a second electrode. The system includes a measurement system configured to sense a capacitance between the first electrode and the second electrode and apply a first offset to the sensed capacitance to provide an offset compensated capacitance.

11 Claims, 8 Drawing Sheets

CAPACITIVE SENSOR AND MEASUREMENT SYSTEM

BACKGROUND

Capacitive sensors are used in a wide variety of applications, such as position sensing, material property monitoring, proximity switching, occupancy detection, fill level detection and measurement, and many others. Capacitive sensors can determine measurands that, in some way, affect the coupling capacitance between two or more electrodes. The capacitive sensors typically include measurement circuitry coupled to the electrodes. The measurement circuitry detects changes in the capacitance between the two or more electrodes. Although capacitive sensors typically measure capacitive coupling, in some applications relevant conductive components may be present.

One type of capacitive sensor is a seat occupancy sensor in an automobile. Seat occupancy sensors typically include large electrodes that may emit electromagnetic radiation that exceeds maximum allowable limits. Seat occupancy sensors and other capacitive sensors also typically include offset capacitances and offset conductances such that only a fraction of a sensed signal varies based on the measurands.

For these and other reasons, there is a need for the present invention.

SUMMARY

One embodiment provides a system. The system includes a capacitive sensor including a first electrode and a second electrode. The system includes a measurement system configured to sense a capacitance between the first electrode and the second electrode and apply a first offset to the sensed capacitance to provide an offset compensated capacitance.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

As used herein, the term "electrically coupled" is not meant to mean that the elements must be directly coupled together and intervening elements may be provided between the "electrically coupled" elements.

Figure 1:
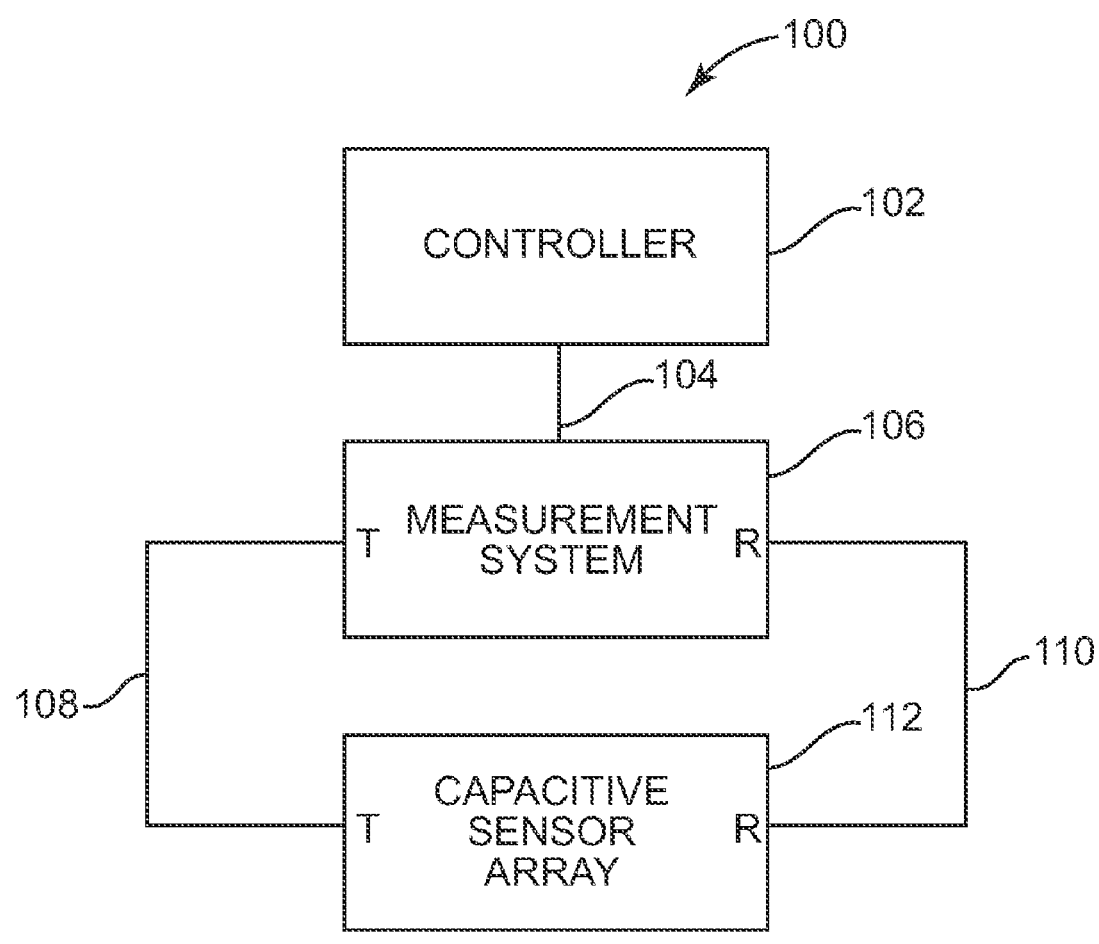
FIG. 1 is a block diagram illustrating one embodiment of a sensor system.

FIG. 1 is a block diagram illustrating one embodiment of a sensor system 100. Sensor system 100 includes a controller 102, a measurement system 106, and a capacitive sensor array 112. In one embodiment, sensor system 100 is used in an automobile as part of the automobile's safety systems. Controller 102 is electrically coupled to measurement system 106 through communication path 104. The transmitter (T) output of measurement system 106 is electrically coupled to the transmitter (T) input of capacitive sensor array 112 through signal path 108. The receiver (R) input of measurement system 106 is electrically coupled to the receiver (R) output of capacitive sensor array 112 through signal path 110.

Controller 102 includes a microprocessor, microcontroller, or other suitable logic circuitry for controlling the operation of measurement system 106. In one embodiment, controller 102 provides control signals to measurement system 106 and receives sensor signals from measurement system 106, which provide information regarding measurands from capacitive sensor array 112.

Capacitive sensor array 112 includes a plurality of capacitor segments. In one embodiment, capacitive sensor array 112 includes a suitable number of transmitter electrodes and a common receiver electrode. In another embodiment, capacitive sensor array 112 includes a suitable number of differential transmitter electrodes (i.e., pairs of transmitter electrodes) and a common receiver electrode. In another embodiment, capacitive sensor array 112 includes a suitable number of differential transmitter electrodes and a differential receiver electrode (i.e., a pair of receiver electrodes). In one embodiment, capacitive sensor array 112 is used as a seat occupancy sensor in an automobile.

In one embodiment, measurement system 106 provides a carrier frequency measurement system for sensing the capacitance and conductance of each capacitor segment in capacitive sensor array 112. Measurement system 106 determines the capacitance and conductance of each capacitor segment by measuring the displacement current when a fixed (alternating) excitation signal (e.g., a sinusoidal signal) is applied between the electrodes of each capacitor segment through signal path 108 and signal path 110. Measurement system 106 uses time division multiple access (TDMA) to sequentially excite one or more electrodes within capacitive sensor array 112 such that all capacitance and conductance values between the transmitter electrodes and the receiver electrodes are obtained after a full sequence of excitation patterns. In one embodiment, measurement system 106 provides capacitance offset compensation and conductance offset compensation to increase the resolution of the measured capacitance and conductance values.

Figure 2A:
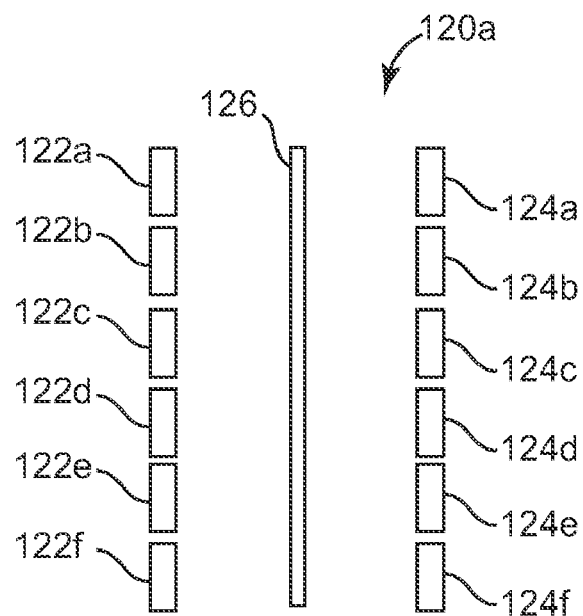
FIG. 2A is a diagram illustrating one embodiment of a capacitive sensor array.

FIG. 2A is a diagram illustrating one embodiment of a capacitive sensor array 120a. In one embodiment, capacitive sensor array 120a provides capacitive sensor array 112 previously described and illustrated with reference to FIG. 1. Capacitive sensor array 120a includes differential transmitter electrode pairs 122a-122f and 124a-124f In other embodiments, capacitive sensor array 120a includes any suitable number of differential transmitter electrode pairs 122 and 124. Capacitive sensor array 120a includes a common receiver electrode 126.

Transmitter electrodes 122a-122f are adjacent to each other and arranged in a first line. Transmitter electrodes 124a-124f are adjacent to each other and arranged in a second line parallel to the first line. Common receiver electrode 126 is parallel to and between transmitter electrodes 122a-122f and transmitter electrodes 124a-124f.

The capacitance and conductance between each differential transmitter electrode pair 122a-122f and 124a-124f and common receiver electrode 126 is affected by objects placed near differential transmitter electrode pairs 122a-122f and 124a-124f and common receiver electrode 126. Measurement system 106 (FIG. 1) senses the capacitance and conductance between each differential transmitter electrode pair 122a-122f and 124a-124f and common receiver electrode 126.

For example, in one embodiment, measurement system 106 applies a first excitation signal to transmitter electrode 122a and a second excitation signal phase shifted 180° from the first excitation signal (i.e., a counter excitation signal) to transmitter electrode 124a. Due to the counter excitation signals applied to transmitter electrodes 122a and 124a, the electromagnetic radiation emitted by capacitive sensor array 120a is reduced compared to a capacitive sensor array that does not includes differential transmitter electrodes.

Measurement system 106 then measures the displacement current through common receiver electrode 126. Measurement system 106 uses TDMA to sequentially excite each pair or group of pairs of transmitter electrodes 122a-122f and 124a-124f to measure the displacement currents for each capacitor segment of capacitive sensor array 120a. From the displacement currents, measurement circuit 106 determines the capacitance and conductance values for each capacitor segment of capacitive sensor array 120a. The capacitance and conductance values provide information about objects placed near differential transmitter electrode pairs 122a-122f and 124a-124f and common receiver 126.

Figure 2B:
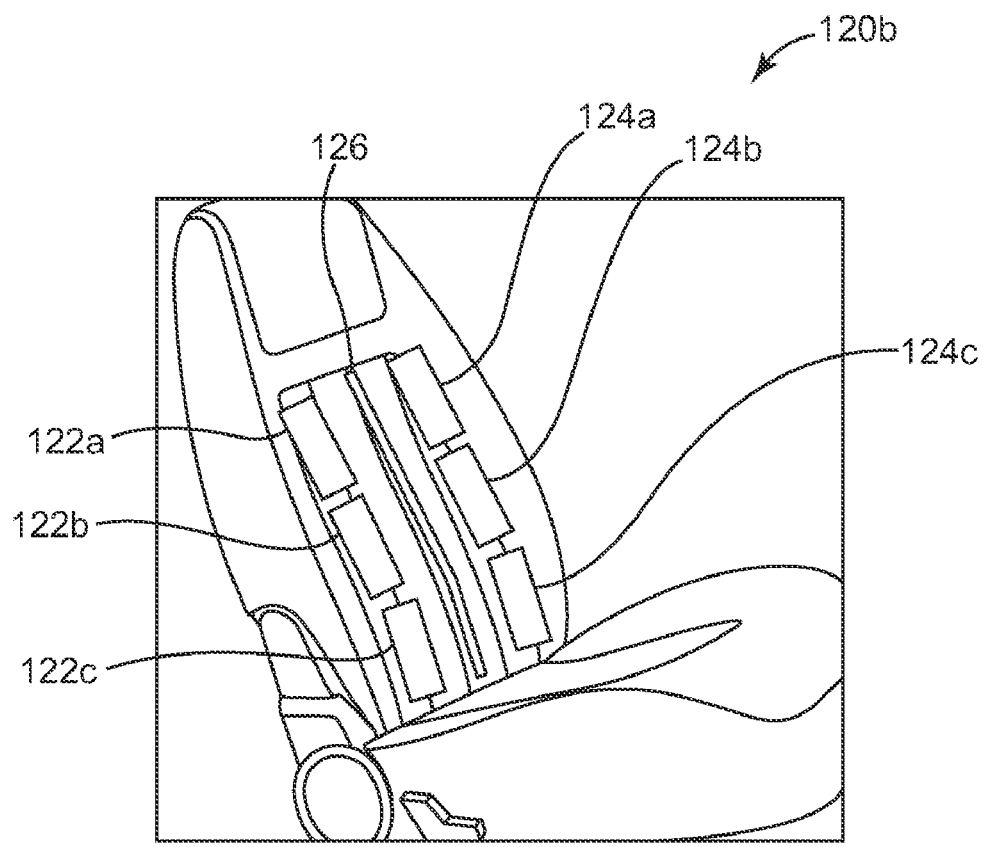
FIG. 2B is a diagram illustrating one embodiment of the capacitive sensor array of FIG. 2A in a seat.

FIG. 2B is a diagram illustrating one embodiment of capacitive sensor array 120a of FIG. 2A in a seat 120b. In this embodiment, capacitive sensor array 120a is placed in a seat back in an automobile. In one embodiment, capacitive sensor array 120a is used as a seat occupancy sensor to determine whether someone is sitting in seat 120b based on the sensed capacitance and conductance values. In addition, in one embodiment, capacitive sensor 120a is used to determine the general height of the seat occupant based on the sensed capacitance and conductance values. In one embodiment, the sensed capacitance and conductance values are used to provide information to the automobile's safety systems. In one embodiment, measurement system 106 passes a seat occupancy signal to controller 102 based on the sensed capacitance and conductance value for use by the automobile's safety systems.

Figure 3A:
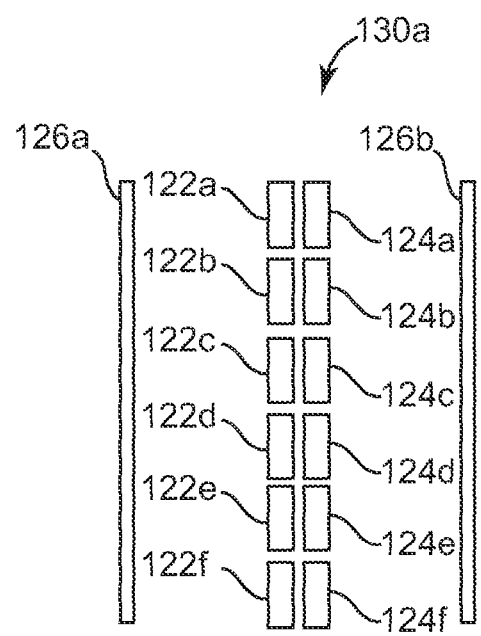
FIG. 3A is a diagram illustrating another embodiment of a capacitive sensor array.

FIG. 3A is a diagram illustrating another embodiment of a capacitive sensor array 130a. In one embodiment, capacitive sensor array 130a provides capacitive sensor array 112 previously described and illustrated with reference to FIG. 1. Capacitive sensor array 130a includes differential transmitter electrode pairs 122a-122f and 124a-124f. In other embodiments, capacitive sensor array 130a includes any suitable number of differential transmitter electrode pairs 122 and 124. Capacitive sensor array 130a includes a differential receiver electrode pair 126a and 126b.

Transmitter electrodes 122a-122f are adjacent to each other and arranged in a first line. Transmitter electrodes 124a-124f are adjacent to each other and arranged in a second line adjacent and parallel to the first line. The close proximity of transmitter electrodes 124a-124f to transmitter electrodes 124a-124f reduces the dipole moment between the electrodes. Differential transmitter electrode pairs 122a-122f and 124a-124f are parallel to and between receiver electrode 126a and receiver electrode 126b.

The capacitance and conductance between each differential transmitter electrode pair 122a-122f and 124a-124f and receiver electrode pair 126a and 126b is affected by objects placed near differential transmitter electrode pairs 122a-122f and 124a-124f and receiver electrode pair 126a and 126b. Measurement system 106 (FIG. 1) senses the capacitance and conductance between each differential transmitter electrode pair 122a-122f and 124a-124f and receiver electrode pair 126a and 126b.

For example, in one embodiment, measurement system 106 applies a first excitation signal to transmitter electrode 122a and a second excitation signal phase shifted by 180° from the first excitation signal (i.e., a counter excitation signal) to transmitter electrode 124a. Due to the counter excitation signals applied to transmitter electrodes 122a and 124a, the electromagnetic radiation emitted by capacitive sensor array 130a is reduced compared to a capacitive sensor array that does not includes differential transmitter electrodes.

Measurement system 106 then measures the displacement current through receiver electrode pair 126a and 126b. The displacement current is measured by determining a difference between the signal from receiver electrode 126a and the signal from receiver electrode 126b. The difference between the signals provides the sum of the capacitance between transmitter electrode 122a and receiver electrode 126a and the capacitance between transmitter electrode 124a and receiver electrode 126b. Measurement system 106 uses TDMA to sequentially excite each pair or group of pairs of transmitter electrodes 122a-122f and 124a-124f to measure the displacement currents for each capacitor segment of capacitive sensor array 130a. From the displacement currents, measurement circuit 106 determines the capacitance and conductance values for each segment of capacitive sensor array 130a. The capacitance and conductance values provide information about objects placed near differential transmitter electrode pairs 122a-122f and 124a-124f and receiver electrode pair 126a and 126b.

Figure 3B:
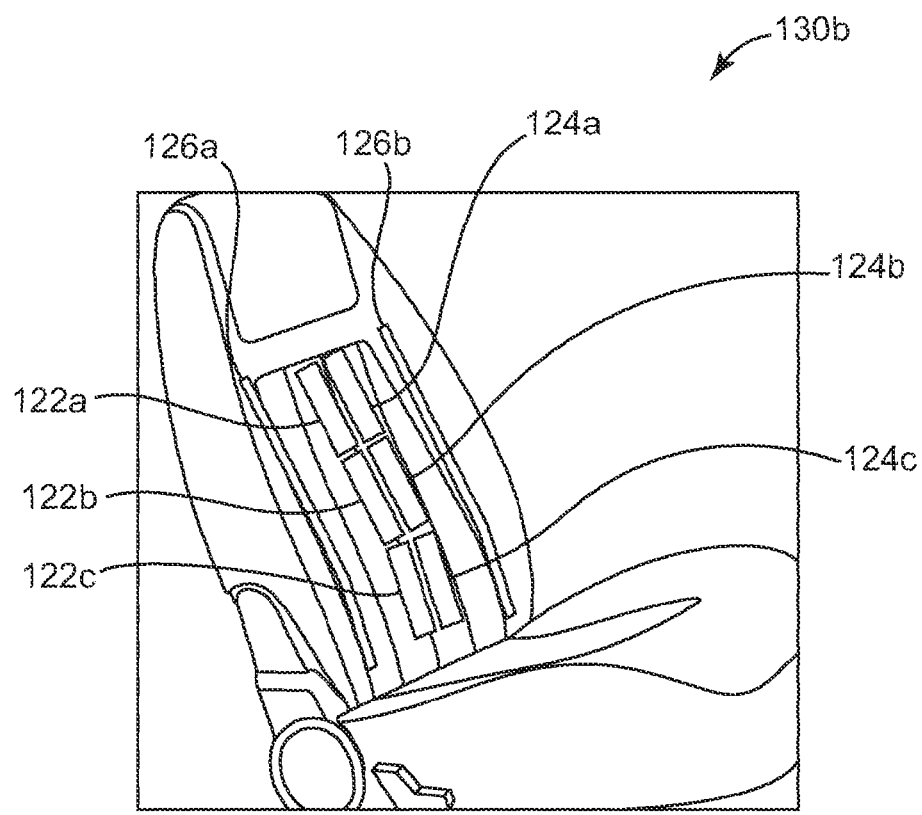
FIG. 3B is a diagram illustrating one embodiment of the capacitive sensor array of FIG. 3A in a seat.

FIG. 3B is a diagram illustrating one embodiment of capacitive sensor array 130a of FIG. 3A in a seat 130b. In this embodiment, capacitive sensor array 130a is placed in a seat back in an automobile. In one embodiment, capacitive sensor array 130a is used as a seat occupancy sensor to determine whether someone is sitting in seat 130b based on the sensed capacitance and conductance values. In addition, in one embodiment, capacitive sensor 130a is used to determine the general height of the seat occupant based on the sensed capacitance and conductance values. In one embodiment, the sensed capacitance and conductance values are used to provide information to the automobile's safety systems. In one embodiment, measurement system 106 passes a seat occupancy signal to controller 102 based on the sensed capacitance and conductance value for use by the automobile's safety systems.

Figure 4A:
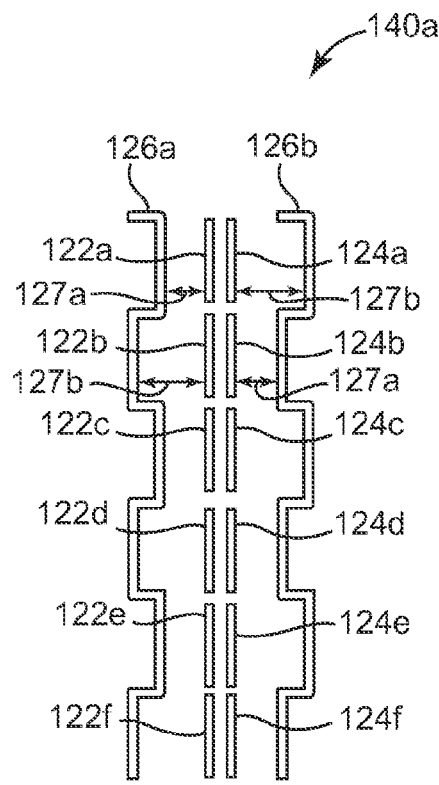
FIG. 4A is a diagram illustrating another embodiment of a capacitive sensor array.

FIG. 4A is a diagram illustrating another embodiment of a capacitive sensor array 140a. In one embodiment, capacitive sensor array 140a provides capacitive sensor array 112 previously described and illustrated with reference to FIG. 1. Capacitive sensor array 140a includes differential transmitter electrode pairs 122a-122f and 124a-124f. In other embodiments, capacitive sensor array 140a includes any suitable number of differential transmitter electrode pairs 122 and 124. Capacitive sensor array 140a includes a differential receiver electrode pair 126a and 126b.

Transmitter electrodes 122a-122f are adjacent to each other and arranged in a first line. Transmitter electrodes 124a-124f are adjacent to each other and arranged in a second line adjacent and parallel to the first line. The close proximity of transmitter electrodes 124a-124f to transmitter electrodes 124a-124f reduces the dipole moment between the electrodes. Differential transmitter electrode pairs 122a-122f and 124a-124f are parallel to and between receiver electrode 126a and receiver electrode 126b.

The spacing between each transmitter electrode 122a-122f and receiver electrode 126a alternates between two distances 127a and 127b. The spacing between each transmitter electrode 124a-124f and receiver electrode 126b also alternates between the two distances 127a and 127b. For example, transmitter electrode 122a is spaced apart from receiver electrode 126a by distance 127a. Transmitter electrode 124a adjacent to transmitter electrode 122a is spaced apart from receiver electrode 126b by distance 127b. For the next transmitter electrode pair 122b and 124b, the distances are reversed such that transmitter electrode 122b is spaced apart from receiver electrode 126a by distance 127b and transmitter electrode 124b is spaced apart from receiver electrode 126b by distance 127a. In other embodiments, the spacing between each transmitter electrode and each receiver electrode sequences through more than two distances.

The capacitance and conductance between each differential transmitter electrode pair 122a-122f and 124a-124f and receiver electrode pair 126a and 126b is affected by objects placed near differential transmitter electrode pairs 122a-122f and 124a-124f and receiver electrode pair 126a and 126b. Measurement system 106 (FIG. 1) senses the capacitance and conductance between each differential transmitter electrode pair 122a-122f and 124a-124f and receiver electrode pair 126a and 126b.

For example, in one embodiment, measurement system 106 applies a first excitation signal to transmitter electrode 122a and a second excitation signal phase shifted 180° from the first excitation signal (i.e., a counter excitation signal) to transmitter electrode 124a. Due to the counter excitation signals applied to transmitter electrodes 122a and 124a, the electromagnetic radiation emitted by capacitive sensor array 140a is reduced compared to a capacitive sensor array that does not includes differential transmitter electrodes.

Measurement system 106 then measures the displacement current through receiver electrode pair 126a and 126b. Measurement system 106 uses TDMA to sequentially excite each pair or group of pairs of transmitter electrodes 122a-122f and 124a-124f to measure the displacement currents for each capacitor segment of capacitive sensor array 140a. From the displacement currents, measurement circuit 106 determines the capacitance and conductance values for each segment of capacitive sensor array 140a. The capacitance and conductance values provide information about objects placed near differential transmitter electrode pairs 122a-122f and 124a-124f and receiver electrode pair 126a and 126b. Due to the varying distances between transmitter electrode pairs 122a-122f and 124a-124f and receiver electrodes 126a and 126b, the capacitance and conductance values provide information for determining the position of objects relative to receiver electrodes 126a and 126b.

Figure 4B:
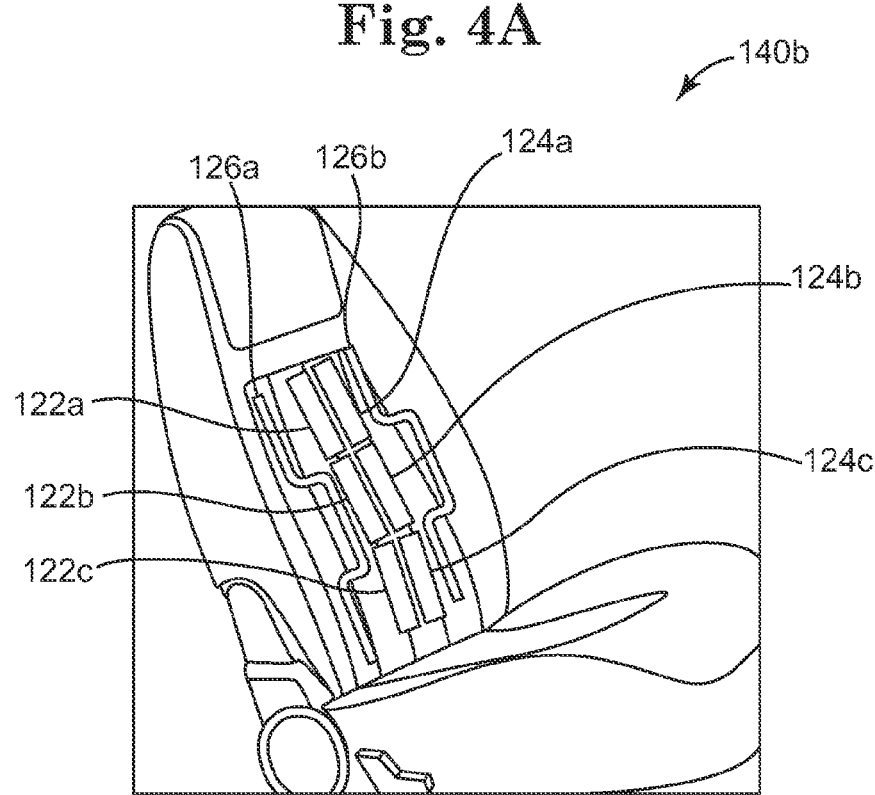
FIG. 4B is a diagram illustrating one embodiment of the capacitive sensor array of FIG. 4A in a seat.

FIG. 4B is a diagram illustrating one embodiment of capacitive sensor array 140a of FIG. 4A in a seat 140b. In this embodiment, capacitive sensor array 140a is placed in a seat back in an automobile. In one embodiment, capacitive sensor array 140a is used as a seat occupancy sensor to determine whether someone is sitting in seat 140b based on the sensed capacitance and conductance values. In one embodiment, capacitive sensor 140a is used to determine the general height of the seat occupant based on the sensed capacitance and conductance values. In addition, in one embodiment, capacitive sensor 140a is used to determine whether the seat occupant is positioned more to one side of the seat than to the other side of the seat. In one embodiment, the sensed capacitance and conductance values are used to provide information to the automobile's safety systems. In one embodiment, measurement system 106 passes a seat occupancy signal to controller 102 based on the sensed capacitance and conductance value for use by the automobile's safety systems.

Figure 5:
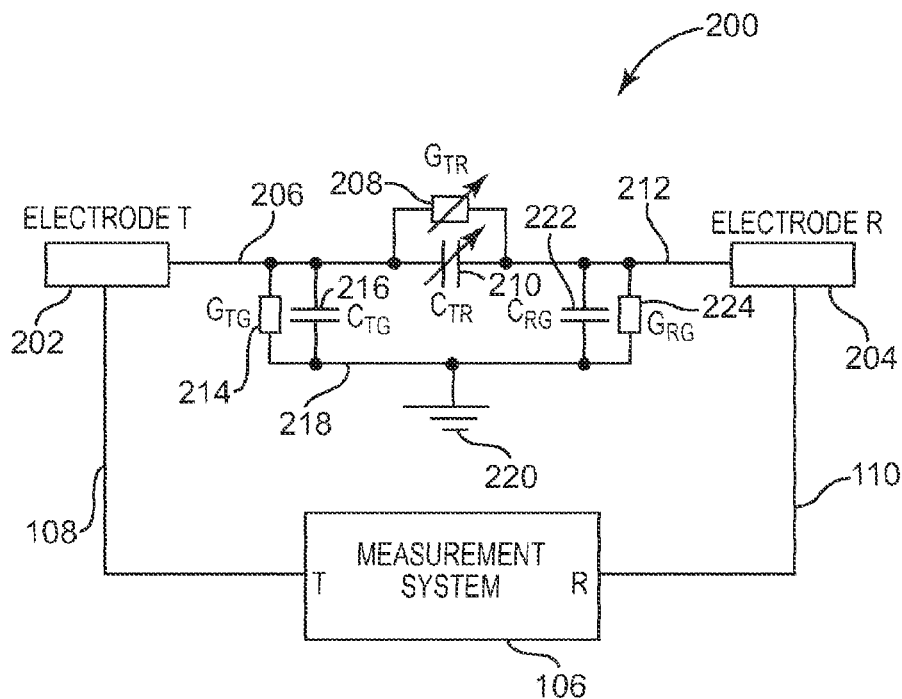
FIG. 5 is a diagram illustrating one embodiment of a capacitor segment of a capacitive sensor array and a measurement system.

FIG. 5 is a diagram illustrating one embodiment of a capacitor segment 200 of capacitive sensor array 112 and measurement system 106. Capacitor segment 200 includes a transmitter electrode 202 and a receiver electrode 204. Measurement system 106 is electrically coupled to transmitter electrode 202 through signal path 108. Measurement system 106 is electrically coupled to receiver electrode 204 through signal path 110.

Between transmitter electrode 202 and receiver electrode 204 are capacitance and conductance values indicated by a variable conductance ($G_{TR}$) 208, a variable capacitance ($C_{TR}$) 210, a parasitic conductance ($G_{TG}$) 214, a parasitic capacitance ($C_{TG}$) 216, a parasitic capacitance ($C_{RG}$) 222, and a parasitic conductance ($G_{RG}$) 224. Transmitter electrode 202 is electrically coupled to one side of $G_{TR}$ 208, one side of $C_{TR}$ 210, one side of $G_{TG}$ 214, and one side of $C_{TG}$ 216 through signal path 206. Receiver electrode 204 is electrically coupled to the other side of $G_{TR}$ 208, the other side of $C_{TR}$ 210, one side of $C_{RG}$ 222, and one side of $G_{RG}$ 224 through signal path 212. The other side of $G_{TG}$ 214, the other side of $C_{TG}$ 216, the other side of $C_{RG}$ 222, and the other side of $G_{RG}$ 224 are electrically coupled to ground 220 through signal path 218.

$G_{TR}$ 208 represents the conductance between transmitter electrode 202 and receiver electrode 204. $C_{TR}$ 210 represents the capacitance between transmitter electrode 202 and receiver electrode 204. $G_{TR}$ 208 and $C_{TR}$ 210 vary based on objects placed near transmitter electrode 202 and receiver electrode 204. $G_{TG}$ 214 represents the parasitic conductance between transmitter electrode 202 and ground 220. $C_{TG}$ 216 represents the parasitic capacitance between transmitter electrode 202 and ground 220. $C_{RG}$ 222 represents the parasitic capacitance between receiver electrode 204 and ground 220. $G_{RG}$ 224 represents the parasitic conductance between receiver electrode 204 and ground 220.

Measurement system 106 applies a fixed (alternating) excitation signal between transmitter electrode 202 and receiver electrode 204 and measures the displacement current between transmitter electrode 202 and receiver electrode 204. From the displacement current, measurement system 106 determines the value of $G_{TR}$ 208 and $C_{TR}$ 210. $G_{TG}$ 214 and $C_{TG}$ 216 provide an additional load for measurement system 106 but do not alter the excitation signal applied to transmitter electrode 202. Input R of measurement system 106 has a low input impedance to compensate for $C_{RG}$ 222 and $G_{RG}$ 224 by shorting $C_{RG}$ 222 and $G_{RG}$ 224. In general, the effect of the conductances is reduced with increasing carrier frequency as the admittance of the coupling impedance becomes more dominated by the capacitive coupling.

Figure 6:
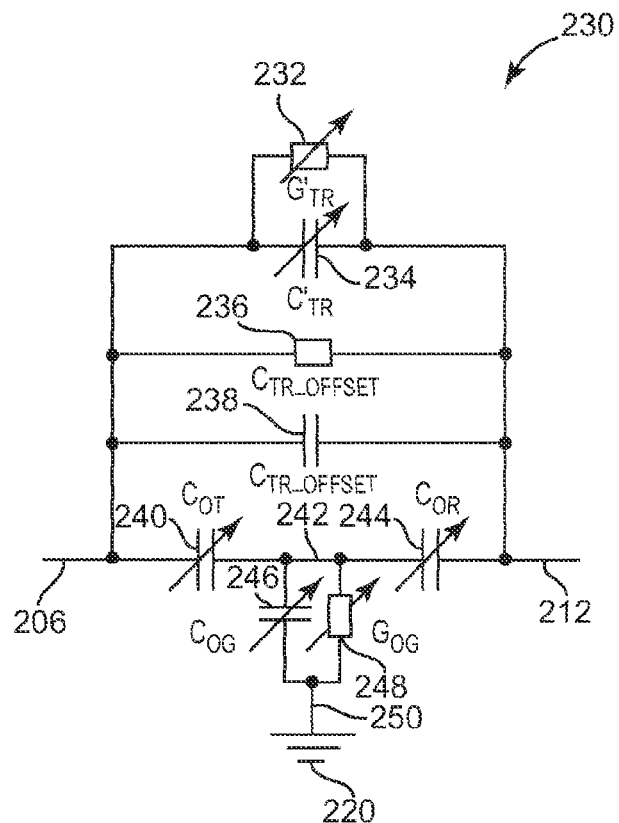
FIG. 6 is a diagram illustrating one embodiment of an equivalent circuit for a portion of a capacitor segment.

FIG. 6 is a diagram illustrating one embodiment of an equivalent circuit 230 for a portion of a capacitor segment. Equivalent circuit 230 represents an equivalent circuit for $G_{TR}$ 208 and $C_{TR}$ 210 between transmitter electrode 202 and receiver electrode 204 as previously described and illustrated with reference to FIG. 5. Equivalent circuit 230 includes a variable conductance ($G'_{TR}$) 232, a variable capacitance ($C'_{TR}$) 234, an offset conductance ($G_{TR\_OFFSET}$) 236, an offset capacitance ($C_{TR\_OFFSET}$) 238, a variable capacitance ($C_{OT}$) 240, a variable capacitance ($C_{OR}$) 244, a variable capacitance ($C_{OG}$) 246, and a variable conductance ($G_{OG}$) 248.

Signal path 206 is electrically coupled to one side of $G'_{TR}$ 232, one side of $C'_{TR}$ 234, one side of $G_{TR\_OFFSET}$ 236, one side of $C_{TR\_OFFSET}$ 238, and one side of $C_{OT}$ 240. Signal path 212 is electrically coupled to the other side of $G'_{TR}$ 232, the other side of $C'_{TR}$ 234, the other side of $G_{TR\_OFFSET}$ 236, the other side of $C_{TR\_OFFSET}$ 238, and one side of $C_{OR}$ 244. The other side of $C_{OR}$ 244 is electrically coupled to the other side of $C_{OT}$ 240, one side of $C_{OG}$ 246, and one side of $G_{OG}$ 248 through signal path 242. The other side of $C_{OG}$ 246 and the other side of $G_{OG}$ 248 are electrically coupled to ground 220 through signal path 250.

$G'_{TR}$ 232 represents the portion of the conductance between transmitter electrode 202 and receiver electrode 204 that varies based on objects placed near transmitter electrode 202 and receiver electrode 204. $C'_{TR}$ 234 represents the portion of the capacitance between transmitter electrode 202 and receiver electrode 204 that varies based on objects placed near transmitter electrode 202 and receiver electrode 204. $G_{TR\_OFFSET}$ 236 represents the offset conductance between transmitter electrode 202 and receiver electrode 204. $C_{TR\_OFFSET}$ 238 represents the offset capacitance between transmitter electrode 202 and receiver electrode 204. $C_{OT}$ 240 and $C_{OR}$ 244 represent capacitances that vary based on objects placed near transmitter electrode 202 and receiver electrode 204. $C_{OG}$ 246 represents the capacitance to ground and $G_{OG}$ 248 represents the conductance to ground, both of which vary based on objects placed near transmitter electrode 202 and receiver electrode 204.

For a single carrier frequency and under a parallel equivalent circuit as illustrated in FIG. 6, the current is given by:

$$I = U(j\omega C + G) \qquad \text{Equation 1}$$

where:

I is the total current;
U is the excitation signal;
ω is the frequency;
j is the imaginary unit;
C is the capacitance between the electrodes; and
G is the conductance between the electrodes.

The imaginary part of I is associated with the capacitance C:

$$C = \frac{1}{\omega} \Im\left\{\frac{I}{U}\right\} \qquad \text{Equation 2}$$

while the real part of I is associated with the conductance G:

$$G = \Re\left\{\frac{I}{U}\right\} \qquad \text{Equation 3}$$

Figure 7:
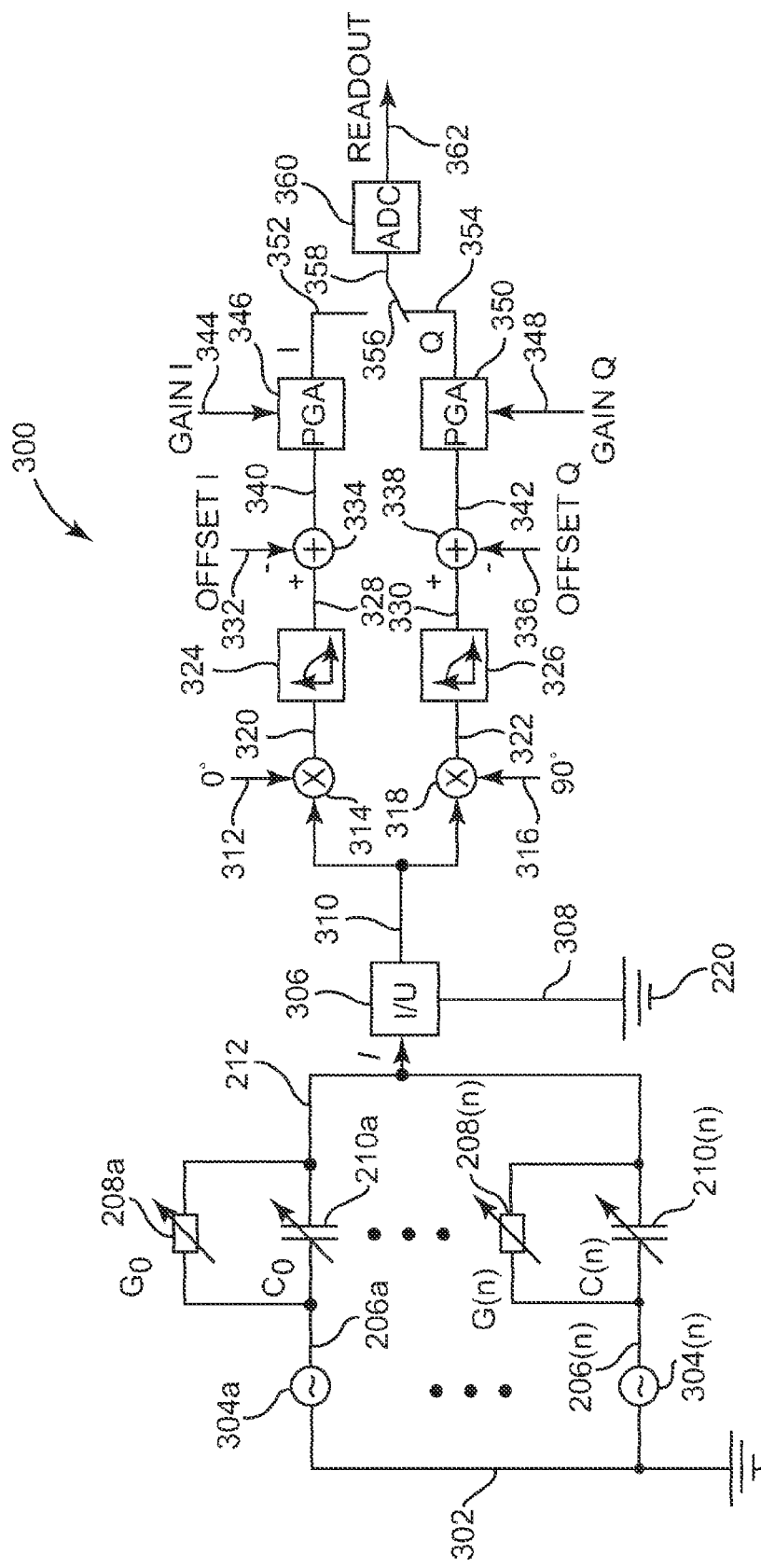
FIG. 7 is a diagram illustrating one embodiment of a capacitive sensor array and a measurement system.

To separate the capacitance and conductance components, an I/Q principle is applied as illustrated in FIG. 7 below.

FIG. 7 is a diagram illustrating one embodiment of a capacitive sensor array and a measurement system 300. Measurement system 300 measures conductances $G_0$-$G_{(n)}$ 208a-208(n) and capacitances $C_0$-$C_{(n)}$ 210a-210(n), where "n" represents any suitable number of segments of a capacitive sensor array. Measurement system 300 includes excitation signal drivers 304a-304(n), a current to voltage converter (I/U) 306, demodulators or multipliers 314 and 318, low pass filters 324 and 326, offset blocks 334 and 338, programmable gain amplifiers (PGAs) 346 and 350, a switch 356, and an analog to digital converter (ADC) 360.

One side of each excitation signal driver 304a-304(n) is electrically coupled to ground 220 through signal path 302. The other side of each excitation signal driver 304a-304(n) is electrically coupled to one side of $G_0$-$G_{(n)}$ 208a-208(n) and one side of $C_0$-$C_{(n)}$ 210a-210(n) through signal paths 206a-206(n), respectively. The other side of $G_0$-$G_{(n)}$ 208a-208(n) and the other side of $C_0$-$C_{(n)}$ 210a-210(n) are electrically coupled to an input of current to voltage converter 306 through I signal path 212. Current to voltage converter 306 is electrically coupled to ground 220 through signal path 308. The output of current to voltage converter 306 is electrically coupled to a first input of multiplier 314 and a first input of multiplier 318 through signal path 310.

A second input of multiplier 314 receives the carrier signal (i.e., the excitation signal) on signal path 312. The output of multiplier 314 is electrically coupled to the input of low pass filter 324 through signal path 320. The output of low pass filter 324 is electrically coupled to a first input of offset block 334 through signal path 328. A second input of offset block 334 receives an OFFSET I signal through OFFSET I signal path 332. The output of offset block 334 is electrically coupled to the input of programmable gain amplifier 346 through signal path 340. The gain input of programmable gain amplifier 346 receives a GAIN I signal on GAIN I signal path 344. The output of programmable gain amplifier 346 is electrically coupled to a first terminal of switch 356 through I signal path 352.

A second input of multiplier 318 receives the carrier signal (i.e., the excitation signal) phase shifted by 90° on signal path 316. The output of multiplier 318 is electrically coupled to the input of low pass filter 326 through signal path 322. The output of low pass filter 326 is electrically coupled to a first input of offset block 338 through signal path 330. A second input of offset block 338 receives an OFFSET Q signal through OFFSET Q signal path 336. The output of offset block 338 is electrically coupled to the input of programmable gain amplifier 350 through signal path 342. The gain input of programmable gain amplifier 350 receives a GAIN Q signal on GAIN Q signal path 348. The output of programmable gain amplifier 350 is electrically coupled to a second terminal of switch 356 through Q signal path 354. Switch 356 is electrically coupled to the input of analog to digital converter 360 through signal path 358. The output of analog to digital converter 360 provides the READOUT signal on READOUT signal path 362.

Each excitation signal driver 304a-304(n) provides a fixed (alternating) excitation signal to a corresponding capacitor segment of the capacitive sensor array for determining the conductance 208a-208(n) and capacitance 210a-210(n) values for each capacitor segment. In one embodiment, each excitation signal driver 304a-304(n) provides a sinusoidal excitation signal or other suitable excitation signal. The excitation signals are provided to each capacitor segment of the capacitive sensor array using TDMA. Based on an object or objects placed near the capacitive sensor array, the conductance 208a-208(n) and capacitance 210a-210(n) values vary the current I on signal path 212.

Current to voltage converter 306 receives the current I on signal path 212 and converts the current I to provide a voltage on signal path 310. In one embodiment, current to voltage converter 306 introduces a phase shift to the voltage on signal path 310. Multiplier 314 receives the voltage on signal path 310 and the excitation signal on signal path 312 to provide a demodulated I channel signal of an I/Q demodulation on signal path 320. Multiplier 314 multiplies the signal on signal path 310 with the signal on signal path 312 to provide the demodulated I channel signal on signal path 320. In one embodiment, multiplier 312 provides a differential signal on signal path 320.

Low pass filter 324 receives the signal on signal path 320 and provides a low pass filtered signal on signal path 328. In one embodiment, low pass filter 324 receives a differential signal on signal path 320 and provides a filtered differential signal on signal path 328. Offset block 334 receives the signal on signal path 328 and the OFFSET I signal on OFFSET I signal path 332 to provide the signal on signal path 340. Offset block 334 subtracts the OFFSET I signal from the signal on signal path 328 to provide an offset capacitance compensated signal on signal path 340. In one embodiment, offset block 334 receives a differential signal on signal path 328 and a differential OFFSET I signal on OFFSET I signal path 332 to provide a differential offset capacitance compensated signal on signal path 340.

Programmable gain amplifier 346 receives the signal on signal path 340 and the GAIN I signal on GAIN I signal path 344 to provide the I signal on I signal path 352. Programmable gain amplifier 346 amplifies the signal on signal path 340 based on the GAIN I signal to provide the amplified signal on I signal path 352. In one embodiment, programmable gain amplifier 346 receives a differential signal on signal path 340 and provides an amplified differential signal on I signal path 352.

Multiplier 318 receives the voltage on signal path 310 and the excitation signal phase shifted by 90° on signal path 316 to provide a demodulated Q channel signal of the I/Q demodulation on signal path 322. Multiplier 318 multiplies the signal on signal path 310 with the signal on signal path 316 to provide the demodulated Q channel signal on signal path 322. In one embodiment, multiplier 318 provides a differential signal on signal path 322.

Low pass filter 326 receives the signal on signal path 322 and provides a low pass filtered signal on signal path 330. In one embodiment, low pass filter 326 receives a differential signal on signal path 322 and provides a filtered differential signal on signal path 330. Offset block 338 receives the signal on signal path 330 and the OFFSET Q signal on OFFSET Q signal path 336 to provide the signal on signal path 342.

Offset block 338 subtracts the OFFSET Q signal from the signal on signal path 330 to provide an offset conductance compensated signal on signal path 342. In one embodiment, offset block 338 receives a differential signal on signal path 330 and a differential OFFSET Q signal on OFFSET Q signal path 336 to provide a differential offset conductance compensated signal on signal path 342.

Programmable gain amplifier 350 receives the signal on signal path 342 and the GAIN Q signal on GAIN Q signal path 348 to provide the Q signal on Q signal path 354. Programmable gain amplifier 350 amplifies the signal on signal path 342 based on the GAIN Q signal to provide the amplified signal on Q signal path 354. In one embodiment, programmable gain amplifier 350 receives a differential signal on signal path 342 and provides an amplified differential signal on Q signal path 354.

Switch 356 selectively couples I signal path 352 to signal path 358 or Q signal path 354 to signal path 358. In one embodiment, switch 356 selectively couples a differential I signal path 352 to a differential signal path 358 or a differential Q signal path 354 to the differential signal path 358. Analog to digital converter 360 converts the analog signal on signal path 358 to a digital value to provide the READOUT signal on READOUT signal path 362. In one embodiment, analog to digital converter 360 receives a differential analog signal on signal path 358. The READOUT signal on READOUT signal path 362 alternately provides the conductance and capacitance values for the selected capacitor segment of the capacitive sensor array.

In one embodiment, where current to voltage converter 306 introduces a phase shift to the voltage on signal path 310, the signal on signal path 320 includes both capacitance and conductance components and the signal on signal path 322 includes both conductance and capacitance components. In this embodiment, offset block 334 compensates for an offset of a first capacitance component and a first conductance component and offset block 338 compensates for an offset of a second conductance component and a second capacitance component.

In operation, measurement system 300 provides a carrier frequency measurement system for a capacitive sensor array including an array of transmitter electrodes and a common receiver electrode. Measurement system 300 provides I/Q demodulation and offset compensation. An excitation signal driver 304a-304(n) applies an excitation signal (i.e., the carrier) to one or more transmitter electrodes with the common receiver electrode coupled to a virtual ground of current to voltage converter 306.

The voltage signal output from current to voltage converter 306 is multiplied with the carrier signal for the I channel and with a 90° phase shifted carrier signal for the Q channel. The I and Q channel signals are then low pass filtered. The offset capacitance is then subtracted from the I channel low pass filtered signal and the offset conductance is subtracted from the Q channel low pass filtered signal.

The GAIN I signal for programmable gain amplifier 346 and the GAIN Q signal for programmable gain amplifier 350 are selected such that the full range of analog to digital converter 360 is used. The I and Q signals output by programmable gain amplifier 346 and programmable gain amplifier 350 are converted to digital values used to determine both the conductive and the capacitive coupling between the selected transmitter electrode(s) and the common receiver electrode. Measurement system 300 uses TDMA such that after each acquisition, another transmitter electrode(s) is excited such that all capacitance and conductance values between the transmitter electrodes and the receiver electrode are obtained after a full sequence of excitation patterns.

Figure 8:
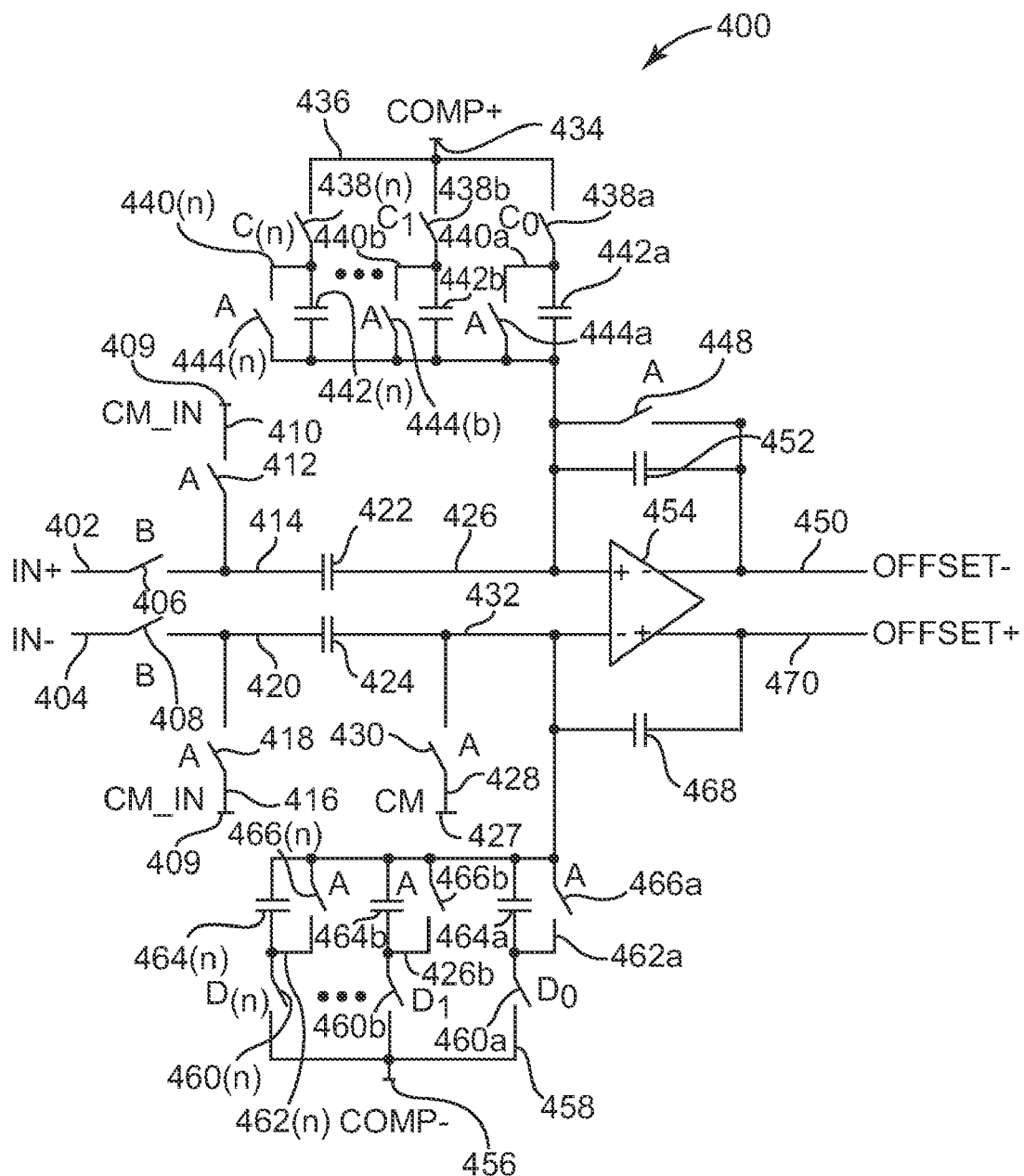
FIG. 8 is a diagram illustrating one embodiment of an offset compensation circuit.

FIG. 8 is a diagram illustrating one embodiment of an offset compensation circuit 400. Offset compensation circuit 400 includes switches 406, 408, 412, 418, 430, 438a-438(n), 444a-444(n), 448, 466a-446(n), and 460a-460(n), capacitors 422, 424, 442a-442(n), 452, 464a-464(n), and 468, and an operational transconductance amplifier (OTA) 454.

One side of switch 406 receives an input signal (IN+) on IN+ signal path 402. The other side of switch 406 is electrically coupled to one side of switch 412 and one side of capacitor 422 through signal path 414. The other side of switch 412 is electrically coupled to a common mode input potential (CM_IN) 409 through signal path 410. The other side of capacitor 422 is electrically coupled to the positive input of OTA 454, one side of capacitor 452, one side of switch 448, one side of each capacitor 442a-442(n), and one side of each switch 444a-444(n) through signal path 426. The other side of each capacitor 442a-442(n) and the other side of each switch 444a-444(n) is electrically coupled to one side of a switch 438a-438(n) through a signal path 440a-440(n), respectively. The other side of each switch 438a-438(n) is electrically coupled to a positive compensation voltage (COMP+) 434 through signal path 436. The negative output of OTA 454 provides the negative offset (OFFSET−) signal and is electrically coupled to the other side of switch 448 and the other side of capacitor 452 through OFFSET− signal path 450.

One side of switch 408 receives an input signal (IN−) on IN− signal path 404. The other side of switch 408 is electrically coupled to one side of switch 418 and one side of capacitor 424 through signal path 420. The other side of switch 418 is electrically coupled to common mode input potential 409 through signal path 416. The other side of capacitor 424 is electrically coupled to the negative input of OTA 454, one side of capacitor 468, one side of switch 430, one side of each capacitor 464a-464(n), and one side of each switch 466a-466(n) through signal path 432. The other side of switch 430 is electrically coupled to a common mode potential (CM) 427 through signal path 428. The other side of each capacitor 464a-464(n) and the other side of each switch 466a-466(n) is electrically coupled to one side of a switch 460a-460(n) through a signal path 462a-462(n), respectively. The other side of each switch 460a-460(n) is electrically coupled to a negative compensation voltage (COMP−) 456 through signal path 458. The positive output of OTA 454 provides the positive offset (OFFSET+) signal and is electrically coupled to the other side of capacitor 468 through OFFSET+ signal path 470.

A first offset compensation circuit 400 is used to provide a differential OFFSET I signal on OFFSET I signal path 332, and a second offset compensation circuit 400 is used to provide a differential OFFSET Q signal on OFFSET Q signal path 336 (FIG. 7). To provide the differential OFFSET I signal, the differential input signal (IN+ and IN−) on signal paths 402 and 404 receive a differential signal from low pass filter 324 through signal path 328. In this case, the differential output signal (OFFSET− and OFFSET+) on signal paths 450 and 470 provide the differential OFFSET I signal on OFFSET I signal path 332. To provide the differential OFFSET Q signal, the differential input signal (IN+ and IN−) on signal paths 402 and 404 receive a differential signal from low pass filter 326 through signal path 330. In this case, the differential output signal (OFFSET− and OFFSET+) on signal paths 450 and 470 provide the differential OFFSET Q signal on OFFSET Q signal path 336.

Offset compensation circuit 400 provides offset compensation using a switched capacitor principle. During a first phase, the switches labeled A (i.e., switches 412, 418, 430, 444a-444(n), 448, and 466a-466(n)) are closed and the switches labeled B (i.e., 406 and 408), $C_0$-$C_{(n)}$ (i.e., 438a-438(n)), and $D_0$-$D_{(n)}$ (i.e., 460a-460(n)) are open. Therefore, the negative input of OTA 454 is coupled to common mode potential 427 of OTA 454. OTA 454 adjusts the OFFSET− and OFFSET+ signals such that the difference between the signal on signal path 426 and the signal on signal path 432 goes to zero. Since switch 448 couples OFFSET− signal path 450 to signal path 426, the negative input of OTA 454 attains the common mode potential 427. In addition, the common mode control of OTA 454 forces the common mode of the OFFSET− and OFFSET+ signals (i.e., the average of the OFFSET− and OFFSET+ signals) to also attain common mode potential 427. Therefore, both the OFFSET− and OFFSET+ signals attain common mode potential 427 and both feedback capacitors 452 and 468 are discharged. In addition, capacitors 442a-442(n) and 464a-464(n) are discharged.

In one embodiment, the input portion of offset compensation circuit 400 is used to perform a level shift between the common mode input potential 409 and common mode potential 427 of OTA 454. During the first phase, signal paths 414 and 420 are coupled to common mode input potential 409 of the previous stage (i.e., the demodulator) and thus the level difference is stored in input capacitors 422 and 424. In one embodiment, the pattern is modified when the differential input signal IN+ and IN− is forced to zero during the compensation period. In this embodiment, the switches 406 and 408 are excluded and signal paths 414 and 420 are coupled to signal paths 402 and 404, respectively. The offset and common mode difference of the stages is stored in input capacitors 422 and 424.

During a second phase, the switches labeled A are opened and the switches labeled B are closed. With switches 406 and 408 closed, OTA 454 is coupled to the IN+ and IN− signals and the OFFSET− and OFFSET+ signals are adjusted based on the amplification factor defined by the capacitor ratios. In addition, switches 438a-438(n) and 460a-460(n) are selectively closed to provide an additional charge injection. In one embodiment switches 438a-438(n) are selectively closed based on a first digital control word and switches 460a-460(n) are selectively closed based on a second digital control word. The additional charge injection and an offset signal based on the capacitor ratio and the level of compensation signals COMP+ 434 and COMP− 456 is added to the differential output signal (OFFSET− and OFFSET+).

Figure 9:
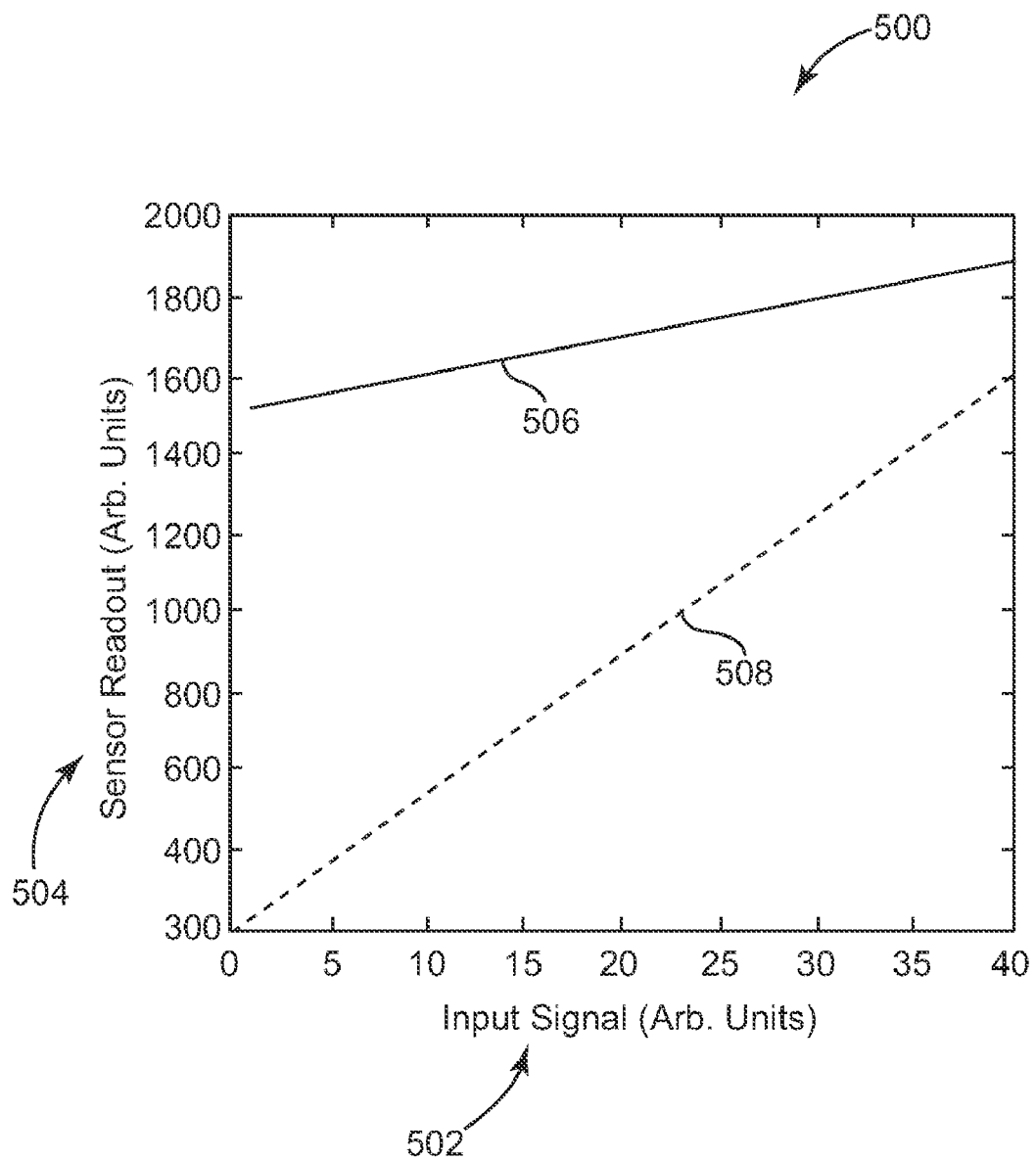
FIG. 9 is a graph illustrating one embodiment of example results with and without offset capacitance compensation.

FIG. 9 is a graph 500 illustrating one embodiment of example results with and without offset capacitance compensation. Graph 500 includes the input signal in arbitrary units on x-axis 502 and the sensor readout in arbitrary units on y-axis 504. Line 506 indicates the sensor readout without capacitance offset compensation and line 508 indicates the sensor readout with capacitance offset compensation.

For the example, the offset signal is approximately 90% of the full scale while the remaining 10% of the signal can be influenced by an object being sensed. As indicated by graph 500, without offset capacitance compensation, only a small fraction of the range of the analog to digital converter can be used. The effective resolution drops to approximately 8 bits for a 12 bit analog to digital converter. With offset capacitance compensation, almost the entire range of the analog to digital converter can be used. The effective resolution rises to approximately 10 bits. Therefore, offset capacitance compensation and offset conductance compensation reduce the impact of quantization noise without increasing the resolution of the analog to digital converter and without reducing the sampling rate. In one embodiment, the sensor performs up to 100 k independent capacitance measurements per second exploiting the full range of the 12 bit analog to digital converter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
    a capacitive sensor including a first electrode and a second electrode; and
    a measurement system configured to sense a capacitance between the first electrode and the second electrode and apply a first offset to the sensed capacitance to provide an offset compensated capacitance,
    wherein the measurement system is configured to sense a conductance between the first electrode and the second electrode and apply a second offset to the sensed conductance to provide an offset compensated conductance.

2. The system of claim 1, wherein the sensed capacitance comprises a first capacitance component and a second capacitance component,
    wherein the sensed conductance comprises a first conductance component and a second conductance component,
    wherein the measurement system is configured to apply the first offset to provide an offset compensated first capacitance component and first conductance component, and
    wherein the measurement system is configured to apply the second offset to provide an offset compensated second conductance component and second capacitance component.

3. The system of claim 1, wherein the measurement system is configured to amplify the offset compensated capacitance by a first gain and to amplify the offset compensated conductance by a second gain.

4. The system of claim 3, wherein the measurement system is configured to convert the amplified capacitance to a digital value and to convert the amplified conductance to a digital value.

5. The system of claim 4, wherein the measurement system is configured to alternately convert the amplified capacitance to a digital value and convert the amplified conductance to a digital value using a single analog to digital converter.

6. The system of claim 1, wherein the measurement system is configured to apply an excitation signal between the first and second electrodes and measure a displacement current between the first and second electrodes to sense the capacitance and the conductance.

7. A method for sensing, the method comprising:
    providing a capacitive sensor including a first electrode and a second electrode;
    sensing a capacitance between the first electrode and the second electrode;
    applying a first offset signal to the sensed capacitance to provide an offset compensated capacitance;
    sensing a conductance between the first electrode and the second electrode; and
    applying a second offset signal to the sensed conductance to provide an offset compensated conductance.

8. The method of claim 7, further comprising:
    amplifying the offset compensated capacitance by a first gain; and
    amplifying the offset compensated conductance by a second gain.

9. The method of claim 8, further comprising:
    converting the amplified capacitance to a first digital value; and
    converting the amplified conductance to a second digital value.

10. The method of claim 9, wherein converting the amplified capacitance to the first digital value and converting the amplified conductance to the second digital value comprises alternately converting the amplified capacitance and the amplified conductance using a single analog to digital converter.

11. The method of claim 7, wherein sensing the capacitance and sensing the conductance comprises:
    applying an excitation signal between the first and second electrodes;
    sensing a displacement current signal between the first and second electrodes; and
    demodulating the displacement current signal to determine the capacitance and the conductance.

* * * * *